(12) United States Patent
Sasaki et al.

(10) Patent No.: US 6,938,722 B2
(45) Date of Patent: Sep. 6, 2005

(54) ELECTRIC POWER STEERING APPARATUS

(75) Inventors: Hiroto Sasaki, Nara (JP); Takehiro Saruwatari, Kashiwara (JP); Kensaku Nakamura, Kashiba (JP); Atsuya Miyata, Osaka (JP); Kazuaki Nagamatsu, Kashiwara (JP); Kunihiro Oka, Kashihara (JP); Hiroshi Murataka, Yamato-Koriyama (JP); Akihiro Hironaka, Yamato-Koriyama (JP)

(73) Assignees: Gates Unitta Asia Company, Osaka (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/352,249

(22) Filed: Jan. 28, 2003

(65) Prior Publication Data

US 2003/0221896 A1 Dec. 4, 2003

(30) Foreign Application Priority Data

| Jan. 29, 2002 | (JP) | 2002-020346 |
|---|---|---|
| Jan. 29, 2002 | (JP) | 2002-020347 |
| Feb. 18, 2002 | (JP) | 2002-040327 |
| Feb. 21, 2002 | (JP) | 2002-044911 |

(51) Int. Cl.$^7$ .............................. B62D 5/04
(52) U.S. Cl. ................... 180/444; 180/443; 474/101
(58) Field of Search ............... 474/101, 112, 474/133, 136, 134; 180/443, 444

(56) References Cited

U.S. PATENT DOCUMENTS

| 3,636,787 A | * | 1/1972 | Nagafuchi et al. ............ 474/89 |
|---|---|---|---|
| 3,768,324 A | * | 10/1973 | Vanderstegen-Drake .... 474/115 |
| 4,568,318 A | * | 2/1986 | Johnson et al. ............. 474/112 |
| 4,631,044 A | * | 12/1986 | Redmon ...................... 474/114 |
| 4,686,433 A |   | 8/1987 | Shimizu |
| 4,825,972 A | * | 5/1989 | Shimizu ..................... 180/444 |
| 4,838,101 A | * | 6/1989 | Dobberpuhl et al. ........ 74/15.63 |
| 4,887,992 A | * | 12/1989 | Dixon ........................ 474/101 |
| 4,889,519 A | * | 12/1989 | Band et al. .................. 474/101 |
| 5,122,198 A | * | 6/1992 | von Hagen et al. ......... 148/651 |
| 6,004,236 A | * | 12/1999 | Suzuki ....................... 474/115 |
| 6,030,305 A | * | 2/2000 | Hood ......................... 474/109 |
| 6,386,313 B1 | * | 5/2002 | Choi .......................... 180/447 |
| 6,691,819 B2 | * | 2/2004 | Menjak et al. .............. 180/446 |
| 2004/0043854 A1 | * | 3/2004 | Fraley et al. ............... 474/134 |

FOREIGN PATENT DOCUMENTS

| FR | 2339520 | 8/1977 |
|---|---|---|
| JP | 62-004673 | 1/1987 |
| JP | 7-293647 | 11/1995 |
| JP | 2000-046136 | 2/2000 |
| WO | WO 01/15959 | 3/2001 |

OTHER PUBLICATIONS

Ex. J–L Geyer, French Search Report, Mar. 8, 2005.

\* cited by examiner

*Primary Examiner*—Paul N. Dickson
*Assistant Examiner*—Daniel Yeagley
(74) *Attorney, Agent, or Firm*—Rabin & Berdo P.C.

(57) ABSTRACT

An electric power steering apparatus includes a speed reducing mechanism for decelerating the rotation of a rotatable shaft in an electric motor and a converting mechanism for converting the output rotation of the speed reducing mechanism into the axial movement of a steering shaft extending toward the right and left sides of a vehicle. The speed reducing mechanism includes an input pulley driven by the electric motor, an output pulley arranged with the steering shaft enclosed thereby, a belt for connecting the input pulley and the output pulley to each other, and a belt tension adjuster.

9 Claims, 17 Drawing Sheets

ELECTRIC POWER STEERING APPARATUS

CROSS REFERENCE TO RELATED APPLICATIONS

The present invention corresponds to and claims benefit of applications No. 2002-020347 and No. 2002-020346 filed with the Japan Patent Office on Jan. 29, 2002, an application No. 2002-040327 filed with the Japan Patent Office on Feb. 18, 2002, and an application No. 2002-044911 filed with the Japan Patent Office on Feb. 21, 2002, all the disclosures of which are hereby incorporated by reference.

BACKGROUND OF THE INVENTION

1. Field of the Invention

The present invention relates to an electronic power steering apparatus that generates a steering assist force by an electric motor.

2. Description of Related Arts

In a rack assist type electronic power steering apparatus, the rotation of an electric motor is decelerated through a pulley/belt mechanism, and is then converted into the axial movement of a rack shaft through a screw ball mechanism enclosing a rack shaft (see JP-B-4-28583, for example).

In this case, a belt is interposed in a power transmission path between the electric motor and the rack shaft. Accordingly, a shock load and vibration from the rack shaft are not transmitted to the electric motor.

However, vibration may be generated in the belt due to fluctuations in the tension of the belt, and transmitted to a housing to propagate into a vehicle chamber, to be noise.

SUMMARY OF THE INVENTION

An object of the present invention is to provide an electric power steering apparatus capable of reducing vibration and noise.

The present invention relates to an electric power steering apparatus comprising an electric motor for producing a steering assist force. The apparatus further comprises a speed reducing mechanism for decelerating the rotation of a rotatable shaft in the electric motor; and a converting mechanism for converting the output rotation of the speed reducing mechanism into the axial movement of a steering shaft extending toward the right and left sides of a vehicle. The speed reducing mechanism comprises an input pulley driven by the electric motor, an output pulley arranged with the steering shaft enclosed thereby, a belt for connecting the input pulley and the output pulley, and a tension adjusting mechanism for adjusting the tension of the belt.

According to the present invention, the tension of the belt is properly adjusted, thereby making it possible to prevent inferior operation and noise generation caused by too much slack in the belt.

The tension adjusting mechanism may include a center-to-center distance changing mechanism for changing a center-to-center distance between the input pulley and the output pulley. The tension adjusting mechanism may comprise a fixed member, a movable member, a tensioner pulley supported on the movable member so as to be rotatable and engaging with the belt, and urging means for urging the tensioner pulley through the movable member in the direction in which tension is applied to the belt.

It is preferable that a supporting shaft in the input pulley is elastically supported on a housing.

It is preferable that a pair of input pulleys, a pair of output pulleys, and a pair of belts are respectively provided, and the input pulley and the output pulley which correspond to each other are connected to each other by a corresponding belt.

DETAILED DESCRIPTION OF THE PREFERRED EMBODIMENT

Figure 1:
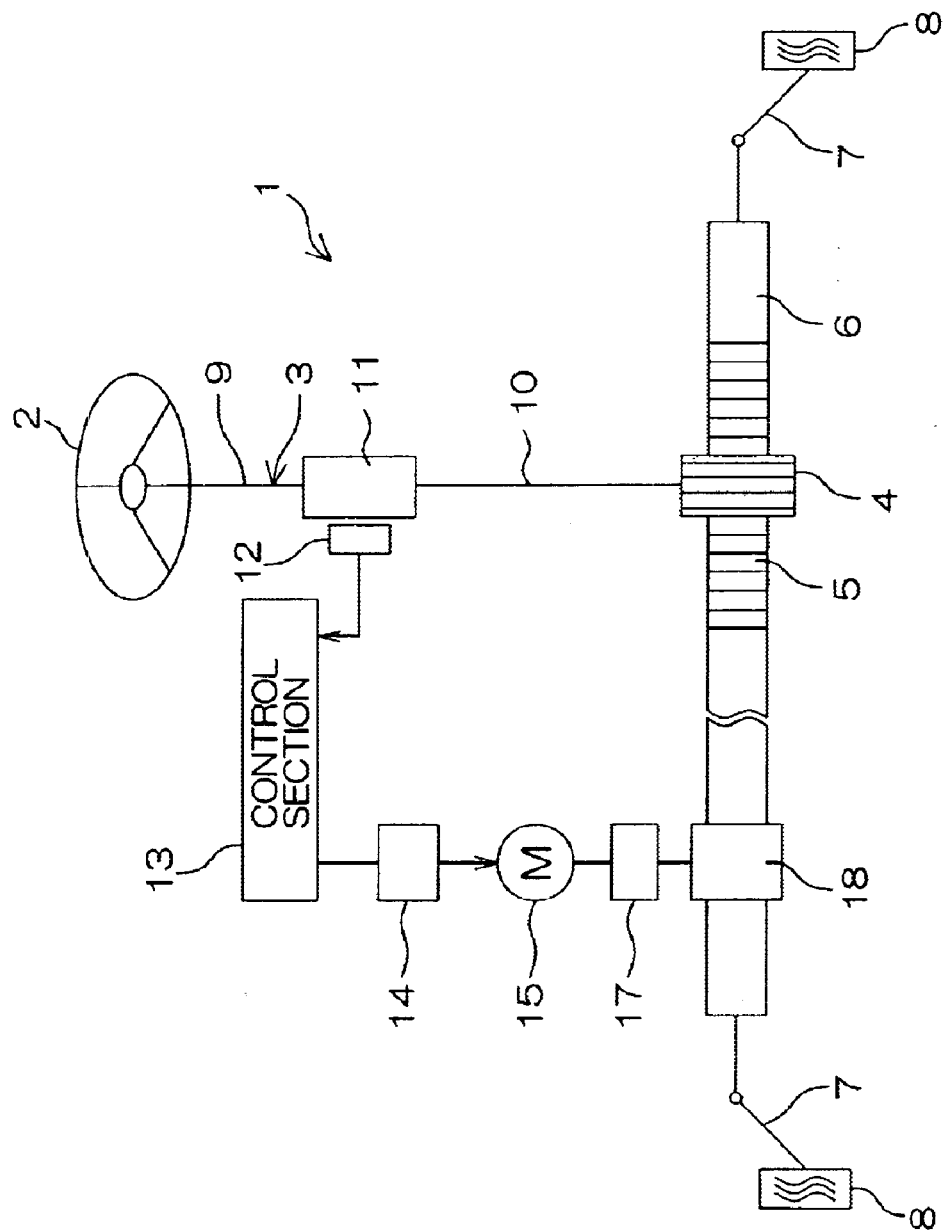
FIG. 1 is a schematic view showing the schematic configuration of an electric power steering apparatus according to a first embodiment of the present invention.

Preferred embodiments of the present invention will be described while referring to the drawings.

First Embodiment

FIG. 1 is a schematic view showing the schematic configuration of an electric power steering apparatus according to a first embodiment of the present invention. Referring to FIG. 1, an electric power steering apparatus (EPS) 1 comprises a steering shaft 3 connected to a steering wheel 2 serving as a steering member, and a rack shaft 6 serving as a steering shaft having a pinion gear 4 provided at a front end of the steering shaft 3 and a rack gear 5 engaging with the pinion gear 4 and extending toward the right and left sides of a vehicle.

Tie rods 7 are respectively coupled to both ends of the rack shaft 6. Each of the tie rods 7 is connected to a corresponding wheel 8 through a corresponding knuckle arm (not shown). When the steering wheel 2 is operated so that the steering shaft 3 is rotated, the rotation is converted into the linear motion of the rack shaft 6 along the right and left sides of the vehicle by the pinion gear 4 and the rack gear 5. Consequently, the rolling steering of the wheel 8 is achieved.

The steering shaft 3 is divided into an input shaft 9 connecting with the steering wheel 2 and an output shaft 10 connecting with the pinion gear 4. The input and output shafts 9 and 10 are coaxially connected to each other through a torsion bar 11.

There is provided a torque sensor 12 for detecting a steering torque by the amount of displacement of the relative rotation between the input shaft 9 and the output shaft 10 through the torsion bar 11. The results of the detection of the torque by the torque sensor 12 are given to a control section 13. In the control section 13, a voltage to be applied to an electric motor 15 for assisting steering through a driver 14 is controlled on the basis of the results of the detection of the torque, the results of the detection of the vehicle speed, etc. The rotation of a rotatable shaft 16 (see FIG. 2) in the electric motor 15 is decelerated through a speed reducing mechanism 17 including a pulley/belt mechanism. The output rotation of the speed reducing mechanism 17 is converted into the axial movement of the rack shaft 6 through a converting mechanism 18, so that steering is assisted. The electric power steering apparatus 1 is of a so-called rack assist type.

Figure 2:
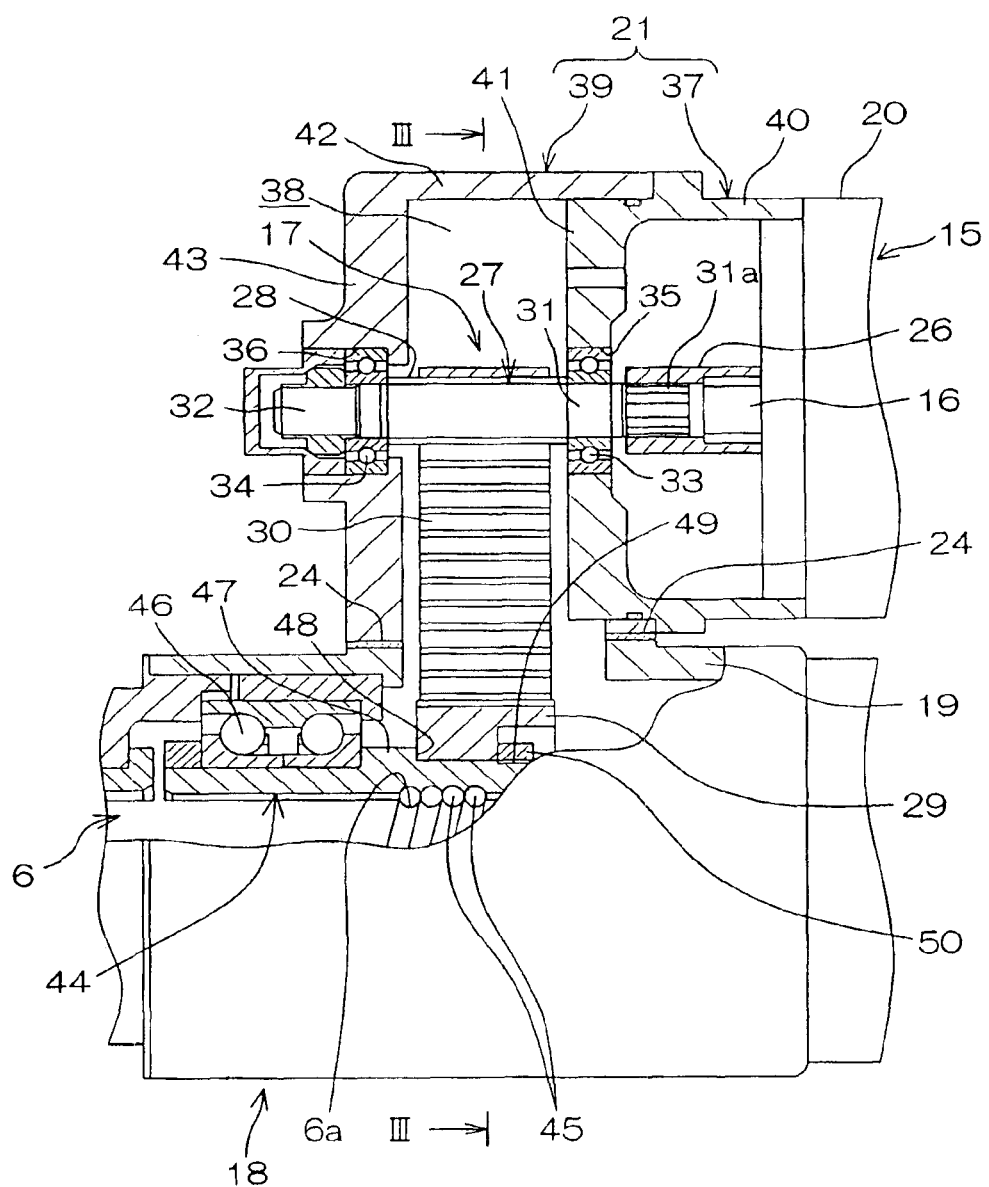
FIG. 2 is a cross-sectional view of a principal part of the electric power steering apparatus according to the first embodiment.
Figure 3:
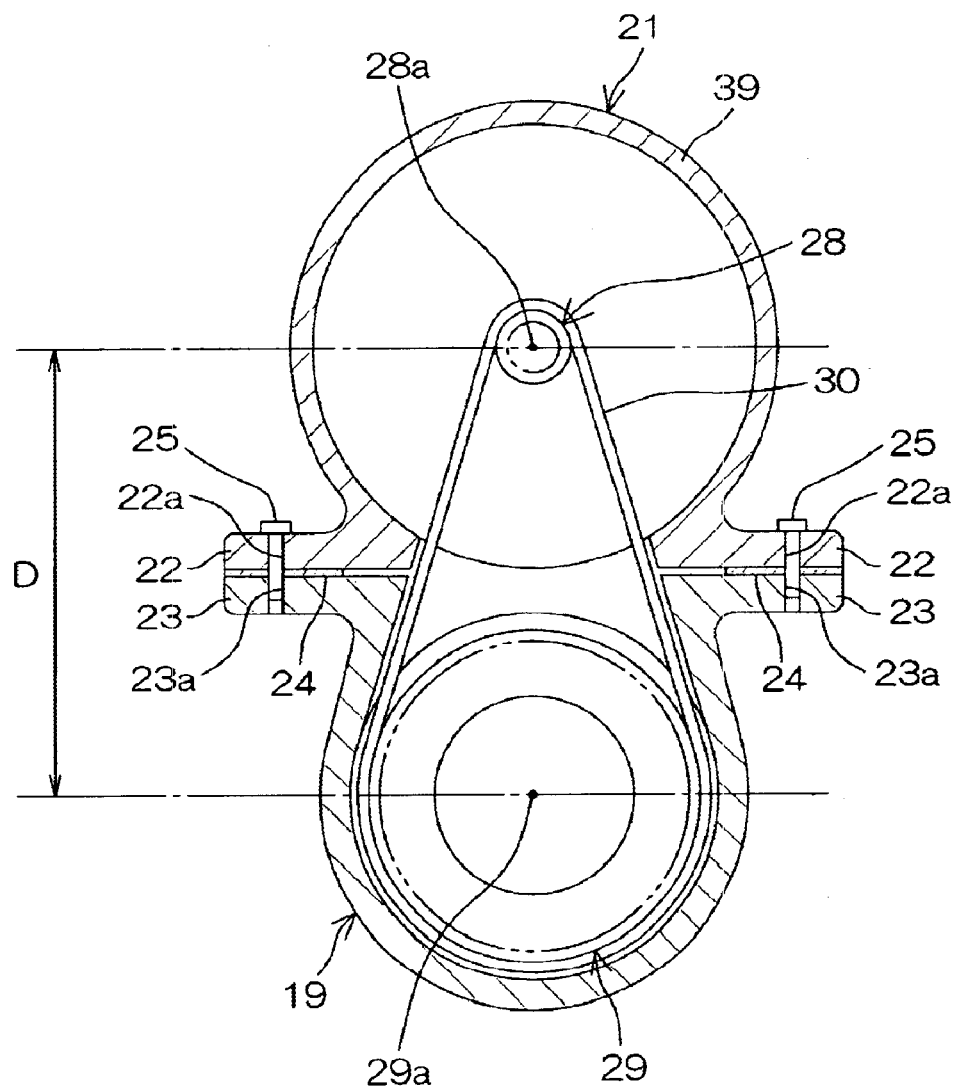
FIG. 3 is a cross-sectional view taken along a line III—III shown in FIG. 2.

Then, FIG. 2 is an enlarged view of a principal part of the electric power steering apparatus 1, and FIG. 3 is a schematic cross-sectional view along a line III—III shown in FIG. 2.

Referring to FIGS. 2 and 3, a motor housing 20 in the electric motor 15 is fixed to a second housing 19 through a first housing 21. The electric motor 15 is provided side by side with the second housing 19. The first housing 21 holds an input pulley 28, described later, in the speed reducing mechanism 17. The second housing 19 functions as a rack housing accommodating the rack shaft 6.

The first housing 21 has a cylindrical shape as a whole, and is provided with mounting flanges 22 serving as a pair of opposite portions to have an approximately Ω shape in cross section. The second housing 19 has mounting flanges 23 serving as opposite portions which are respectively opposed to the mounting flanges 22 in the first housing 21. Both the mounting flanges 22 and 23 are fastened to each other by a screw 25 in a state where a spacer 24 such as a shim is interposed between the mounting flanges 22 and 23. The screw 25 is inserted through a screw insertion hole 22a of the mounting flange 22, for example, and is screwed into a screw hole 23a of the mounting flange 23.

The present embodiment is characterized in that the distance between the first housing 21 and the second housing 19 is adjusted by adjusting the thickness of the spacer 24, thereby adjusting the distance between center axes 28a and 29a of the input and output pulleys 28 and 29 (a center-to-center distance D), as described later, through which the adjustment of the tension of a belt 30 is achieved. That is, a center-to-center distance changing member serving as a tension adjusting member is constituted by the spacer 24.

The speed reducing mechanism 17 comprises an input shaft 27 coaxially connected to the rotatable shaft 16 in the electric motor 15 through a coupling joint 26 using a spline 31a, for example, an input pulley 28 having a small diameter provided so as to be integrally rotatable in an intermediate portion in the axial direction of the input shaft 27, an output pulley 29 having a large diameter arranged with the rack shaft 6 serving as a steering shaft enclosed thereby, and a belt 30 wrapped between the input and output pulleys 28 and 29. The belt 30 is composed of a toothed belt (cocked belt), for example, and the input pulley 28 is constructed as a toothed pulley having teeth engaging with the toothed belt formed at equally spaced divisions in its circumferential direction on the outer periphery of the input shaft 27. A toothed pulley is also similarly used as the output pulley 29.

The input shaft 27 has first and second ends 31 and 32, and the first and second ends 31 and 32 are supported so as to be rotatable by corresponding supporting holes 35 and 36 in the first housing 21 through corresponding bearings 33 and 34.

The first end 31 of the input shaft 27 is connected so as to be integrally rotatable to the rotatable shaft 16 in the electric motor 15 through the coupling joint 26.

The first housing 21 comprises a connection housing 37 connected to the motor housing 20 so as to cover a portion where the rotatable shaft 16 projects from the motor housing 20, and a speed reducing mechanism housing 39 for defining an accommodation chamber 38 accommodating a principal part of the speed reducing mechanism 17 in corporation with the connection housing 37.

The connection housing 37 has a cylindrical shape, and accommodates the above-mentioned coupling joint 26. The connection housing 37 has a peripheral wall 40 and an end wall 41, and the end wall 41 is provided with the above-mentioned supporting hole 35.

The speed reducing mechanism housing 39 has a peripheral wall 42 fitted in the peripheral wall 40 of the connection housing 37 in a fluid-tight manner, and an end wall 43. The end wall 43 is provided with the above-mentioned supporting hole 36. The input pulley 28 is accommodated in the accommodation chamber 38 defined by the connection housing 37 and the speed reducing mechanism housing 39. The above-mentioned mounting flanges 22 are provided in both the connection housing 37 and the speed reducing mechanism housing 39.

As the converting mechanism 18, rotational motion can be converted into linear motion using a ball screw mechanism or a bearing screw mechanism, for example (see JP-A-2000-46136, for example). In the present embodiment, description is made in conformity with an example in which the ball screw mechanism is used. The converting mechanism 18 comprises a ball nut 44 serving as a body of rotation surrounding the rack shaft 6.

The ball nut 44 is screwed into a ball screw groove 6a formed in a halfway portion of the rack shaft 6 through a ball screw 45, thereby constituting the converting mechanism 18. The ball nut 44 is supported on the rack housing 19 so as to be rotatable through a bearing 46. Further, the above-mentioned output pulley 29 is fitted in an outer periphery 47 of the ball nut 44 so as to be integrally rotatable. Specifically, the output pulley 29 is fixed to the ball nut 44 by holding the output pulley 29 between a step 48 formed in the outer periphery 47 of the ball nut 44 and a fixed screw 50 screwed into a screw 49 in the outer periphery 47.

According to the present embodiment, the distance between the center axes 28a and 29a of the input and output pulleys 28 and 29 (the center-to-center distance D) can be adjusted easily and at low cost by adjusting the thickness of the spacer 24 serving as a center-to-center distance changing member composed of a shim or the like. Furthermore, the tension of the belt 30 can be adjusted easily and at low cost, and inferior operation and noise generation related to the belt 30 can be prevented.

Second Embodiment

Figure 4:
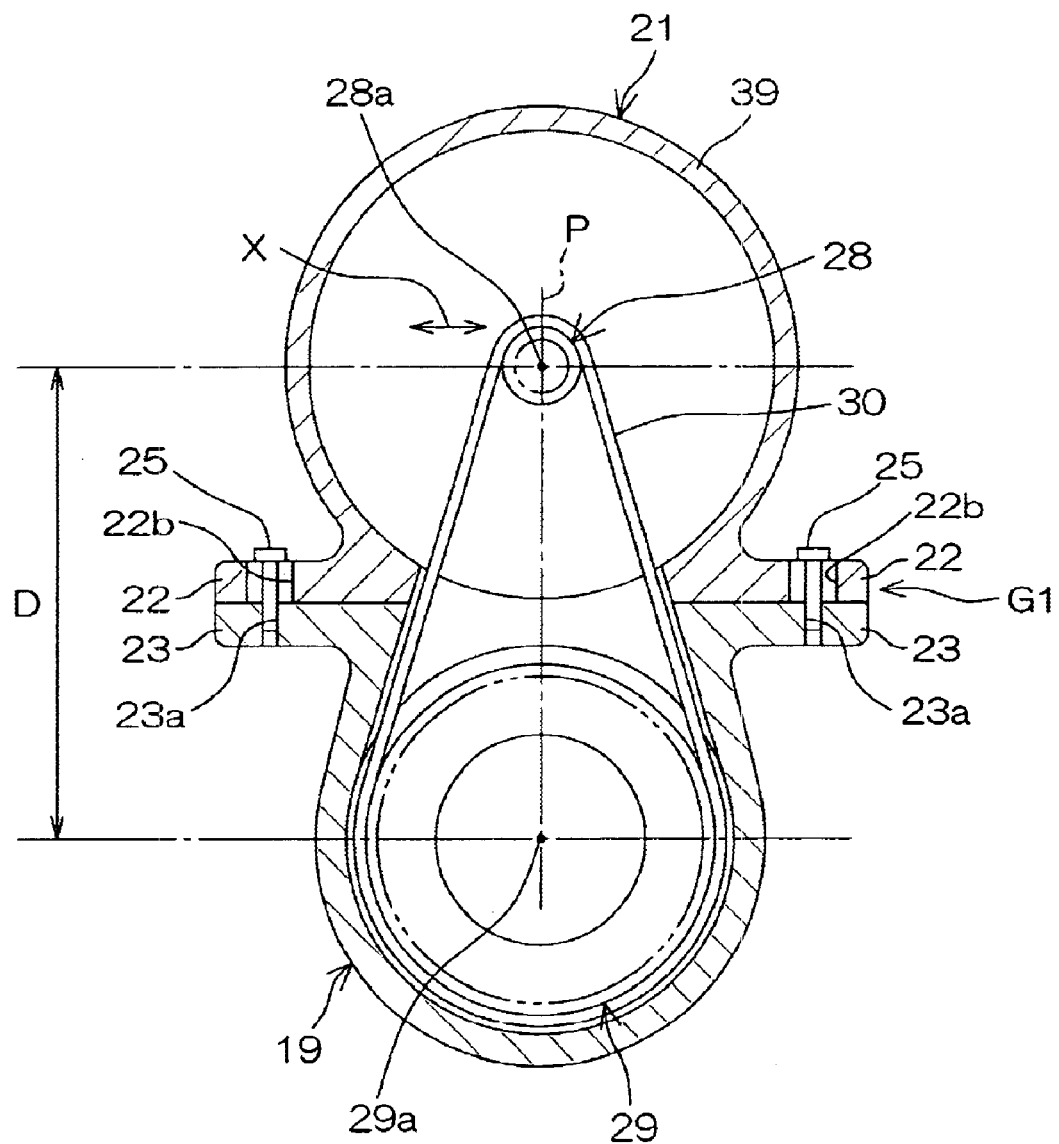
FIG. 4 is a cross-sectional view of a principal part of an electric power steering apparatus according to a second embodiment of the present invention.

Then, FIG. 4 illustrates a second embodiment of the present invention. Referring to FIG. 4, the present embodiment differs from the first embodiment shown in FIG. 3 in that the spacer 24 is abandoned, and a first housing 21 for holding an input pulley 28 and a rack housing 19 serving as a second housing for holding an output pulley 29 through a bearing 46 and a rack shaft 6 are relatively slid in a lateral direction X along their mounting flanges 22 and 23 to adjust a center-to-center distance D between respective center axes 28a and 29a of the input and output pulleys 28a and 29a. The lateral direction X is a direction approximately perpendicular to a plane P including the center axes 28a and 29a.

In order to allow the foregoing, a screw insertion hole 22b of the mounting flange 22 is formed into a slot along the lateral direction X, to guide the relative slide between both the housings 19 and 21 in the lateral direction X through the screw insertion hole 22b composed of the slot. The second embodiment is the same as the first embodiment shown in FIG. 3 in that a screw hole 23a screwed into a screw 25 is formed in the mounting flange 23. The mounting flanges 22 and 23 serving as opposite portions which are brought into contact with each other, the screw 25, and the screw insertion hole 22b composed of the slot constitute a guiding mechanism G1 serving as a center-to-center distance changing mechanism.

In the second embodiment, both the housings 21 and 19 are relatively slid in the lateral direction X, thereby making it possible to adjust the tension of the belt 30 easily and at low cost while achieving space saving.

Third Embodiment

Figure 5:
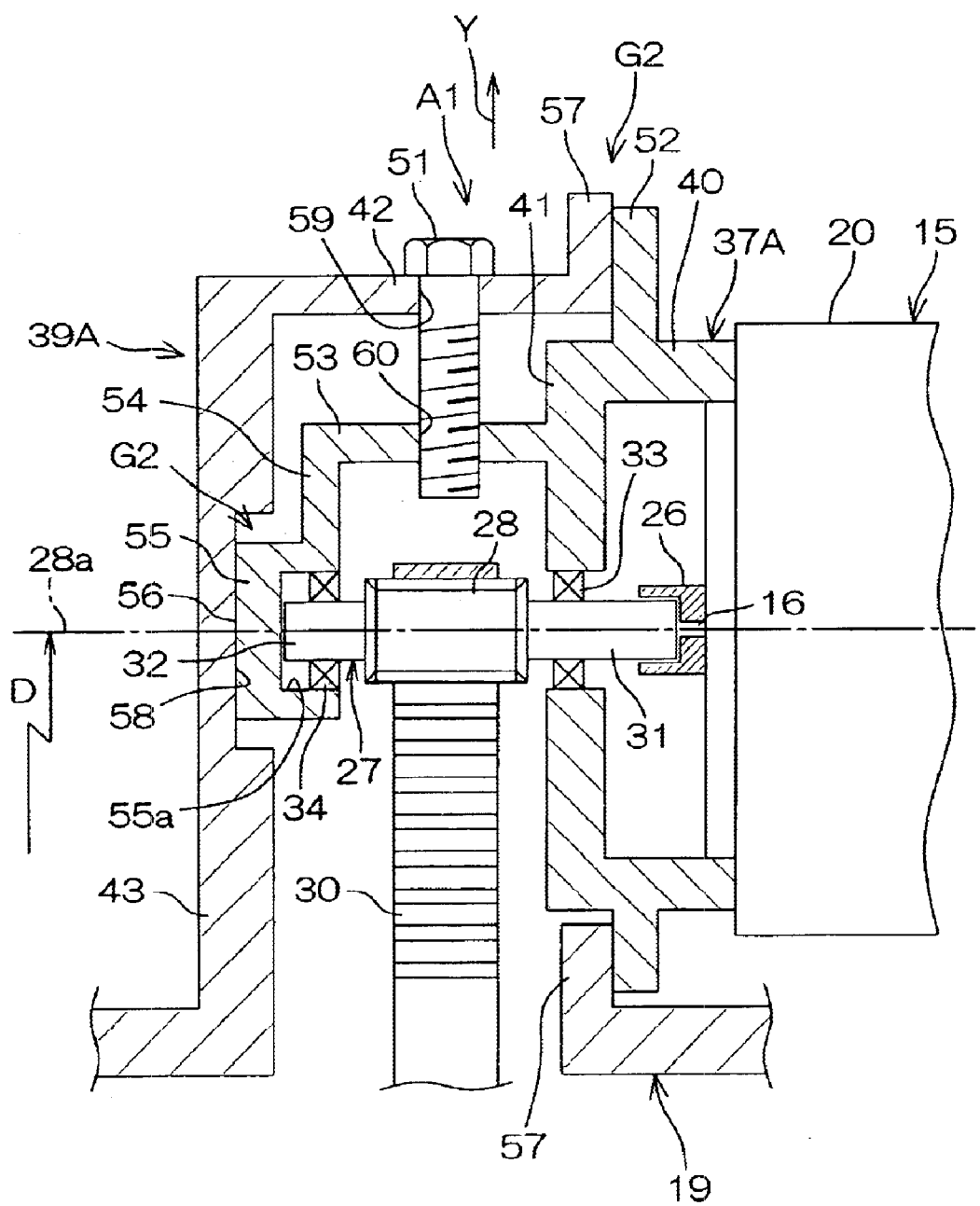
FIG. 5 is a cross-sectional view of a principal part of an electric power steering apparatus according to a third embodiment of the present invention.

Then, FIG. 5 illustrates a third embodiment of the present invention. Referring to FIG. 5, the third embodiment differs from the second embodiment shown in FIG. 4 in that both the housings 21 and 19 are relatively slid along a lateral direction X in the second embodiment shown in FIG. 4, while a rack housing 19 and a connection housing 37A are relatively slid along a longitudinal direction Y to adjust a center-to-center distance D, and there is provided a single drive screw 51 for relatively sliding the rack housing 19 and the connection housing 37A along the longitudinal direction Y in the present embodiment. The longitudinal direction Y is a direction approximately perpendicular to both a center axis 28a and a center axis 29a.

Specifically, there is provided a guided section 52 composed of an outward annular flange in a peripheral wall 40 of the connection housing 37A, and there is provided an extended section 53 extending parallel to an input shaft 27 from an end wall 41 of the connection housing 37A. Further, an end wall 54 parallel to an end wall 43 of a speed reducing mechanism housing 39A is provided so as to extend from a front end of the extended section 53, and a cylindrical section 55 projecting in a stepped shape is formed in the end wall 54. An end surface of the cylindrical section 55 forms a guided section 56. A second end 32 of the input shaft 27 is supported so as to be rotatable by an inner peripheral surface 55a of the cylindrical section 55 through a bearing 34.

On the other hand, the speed reducing mechanism housing 39A is integrally formed as a part of the rack housing 19, and a guiding section 57 for guiding the above-mentioned guided section 52 is formed in the rack housing 19 and the speed reducing mechanism housing 39A. Further, a guiding section 58 composed of a recess, for example, for guiding the guided section 56 is formed in the end wall 43 of the speed reducing mechanism housing 39A. The guided sections 52 and 56 and the guiding sections 57 and 58 constitute a guiding mechanism G2. The drive screw 51 is inserted through a screw insertion hole 59 of a peripheral wall 42 of the speed reducing mechanism housing 39A, and is screwed into a screw hole 60 of the extended section 53 in the connection housing 37A. The guiding mechanism G2 and the drive screw 51 constitute a center-to-center distance changing mechanism A1.

According to the present embodiment, the tension of a belt 30 can be adjusted easily and with high precision by managing a torque for fastening the drive screw 51, and inferior operation and noise generation related to the belt 30 can be prevented.

Fourth Embodiment

Figure 6:
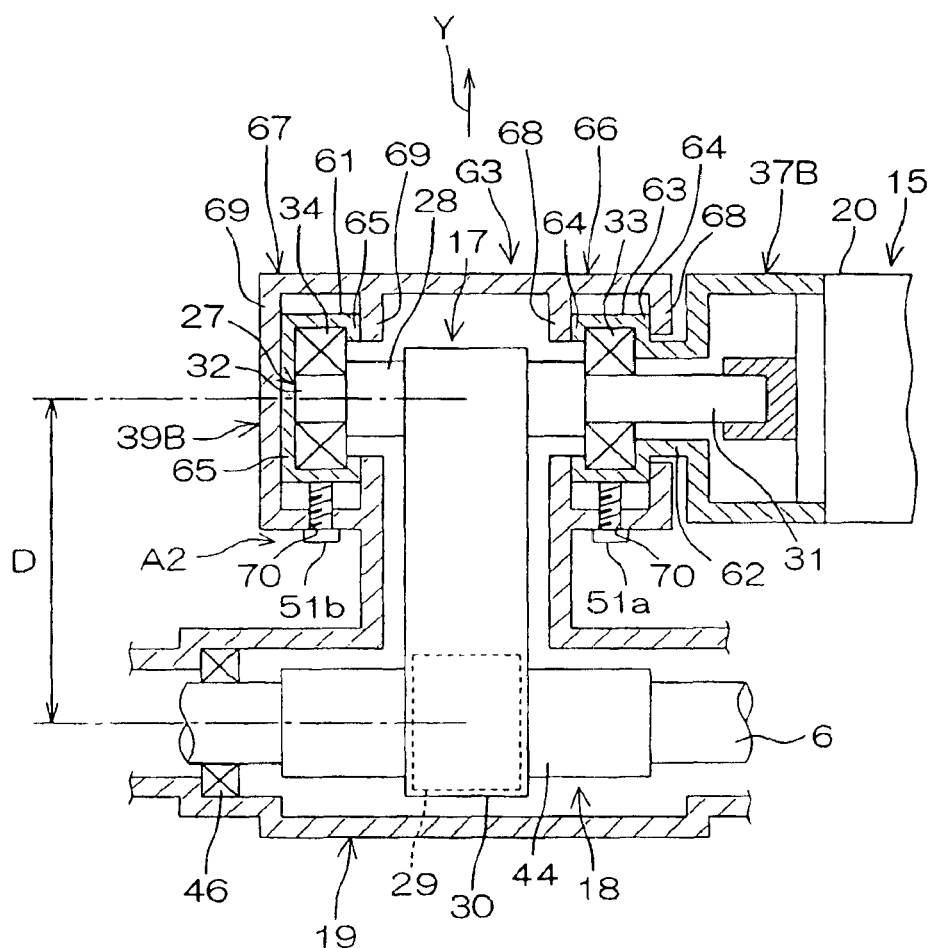
FIG. 6 is a cross-sectional view of a principal part of an electric power steering apparatus according to a fourth embodiment of the present invention.

Then, FIG. 6 illustrates a fourth embodiment of the present invention. Referring to FIG. 6, the present embodiment differs from the embodiment shown in FIG. 5 in that the center-to-center distance D is increased by pulling the connection housing 37A for holding an input pulley 28 and the motor housing 20 in the operation of the single drive screw 51, to increase the tension of the belt 30 in the embodiment shown in FIG. 5, while a center-to-center distance D is increased by pressing a connection housing 37B for supporting a first end 31 of an input shaft 27 and a support housing 61 for supporting a second end 32 of the input shaft 27 along a longitudinal direction Y in the operation of a pair of drive screws 51a and 51b arranged on both sides with a belt 30 interposed therebetween, to increase the tension of the belt 30 in the present embodiment.

The connection housing 37B has a reduced diameter portion 62 and a large diameter portion 63 nearer to its front end than the reduced diameter portion 62, to support the first end 31 of the input shaft 27 through a bearing 33 by the large diameter portion 63. The large diameter portion 63 has a guided section 64 composed of a pair of annular flanges.

The support housing 61 has the shape of a cylinder having a bottom, to support the second end 32 of the input shaft 27 through a bearing 34. The bottom of the support housing 61 and the annular flanges constitute a pair of guided sections 65.

On the other hand, a speed reducing mechanism housing 39B is integrally formed in a rack housing 19, and has a pair of holding sections 66 and 67 having a groove shape in cross section for respectively holding the connection housing 37B and the support housing 61. A pair of opposite walls of the holding sections 66 and 67 constitutes guiding sections 68 and 69 for respectively guiding the guided sections 64 and 65. The guided sections 64 and 65 and the guiding sections 68 and 69 for guiding the guided sections 64 and 65 constitute a guiding mechanism G3, and the guiding mechanism G3 and a pair of drive screws 51a and 51b constitute a center-to-center distance adjusting mechanism A2 serving as a tension adjusting mechanism.

The pair of drive screws 51a and 51b is screwed into screw holes 70 respectively formed in the holding sections 66 and 67, to abut their front ends against the large diameter portion 63 in the connection housing 37B and an outer peripheral surface of the support housing 61.

According to the present embodiment, the input shaft 27 and an input pulley 28 can be moved with high precision parallel to a center axis 29a of an output pulley 29 by the pair of drive screws 51a and 51b on both sides with the belt 30 interposed therebetween. In the present embodiment, the center-to-center distance D may be adjusted by pulling the connection housing 37B and the support housing 61 upward in FIG. 6 by the pair of drive screws 51a and 51b.

Fifth Embodiment

Figure 7:
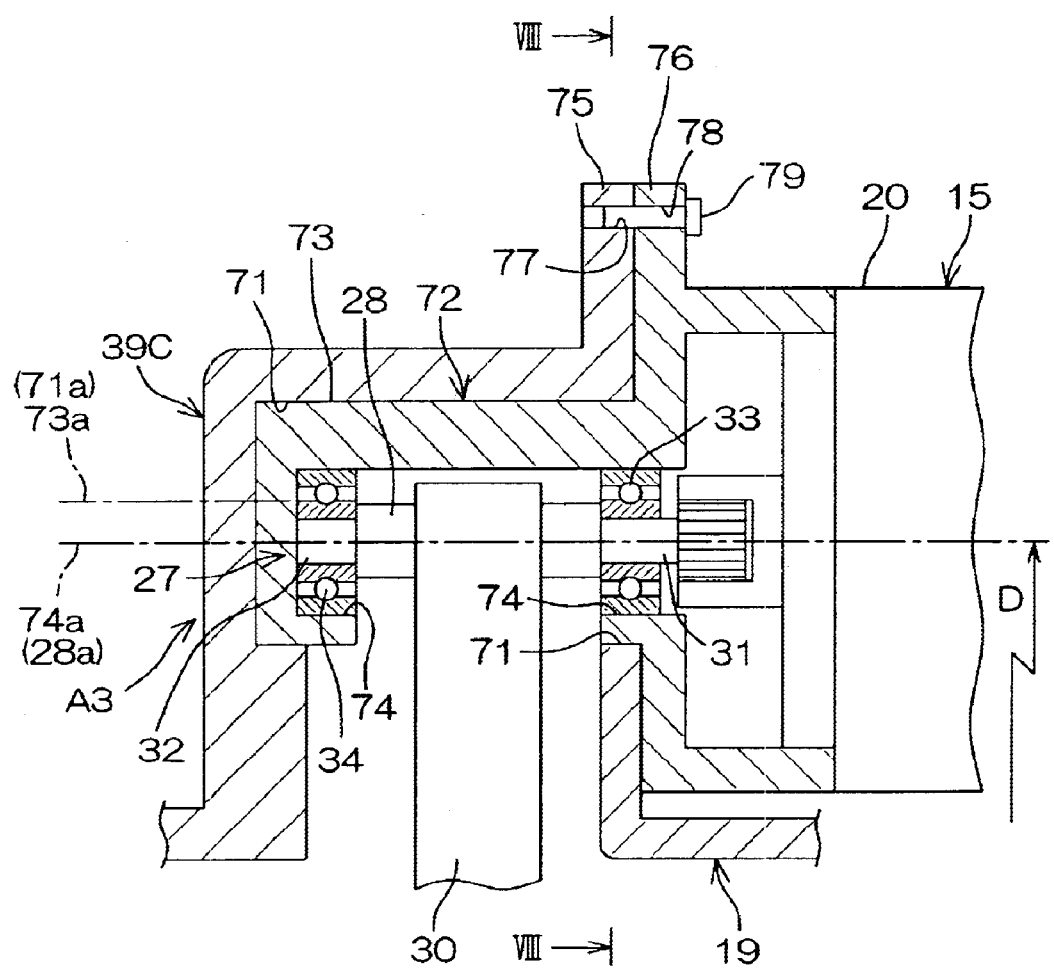
FIG. 7 is a cross-sectional view of a principal part of an electric power steering apparatus according to a fifth embodiment of the present invention.
Figure 8:
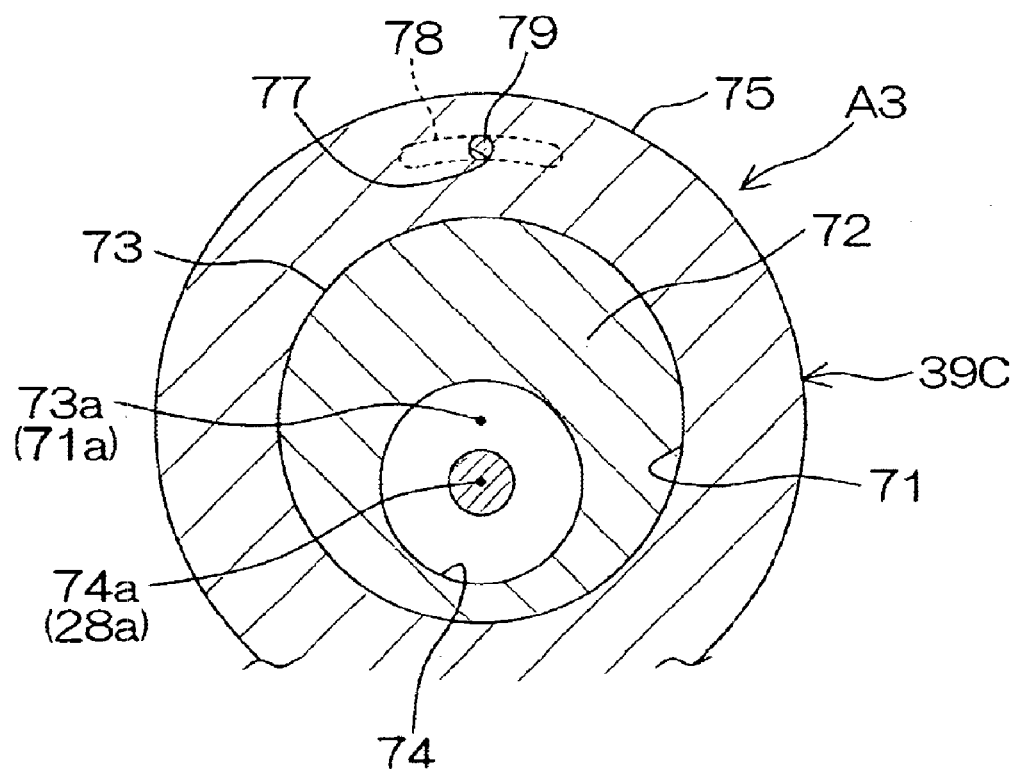
FIG. 8 is a cross-sectional view taken along a line VIII—VIII shown in FIG. 7.

Then, FIGS. 7 and 8 illustrate a fifth embodiment of the present invention. Referring to FIGS. 7 and 8, the present embodiment is characterized in the following. That is, a fixed housing 39C serving as a speed reducing mechanism housing integrally formed in a rack housing 19 is provided with a circular hole 71. A movable housing 72 integrally extending from a motor housing 20 in an electric motor 15 has a circular radially outer portion 73 fitted in the circular hole 71 so as to be rotatable. Further, the movable housing 72 has an eccentric hole 74 for respectively supporting first and second ends 31 and 32 of an input shaft 27 so as to be rotatable through bearings 33 and 34. The center 74a of the eccentric hole 74 is eccentric from the center 73a of the circular radially outer portion 73 in the movable housing 72 (corresponding to the center 71a of the circular hole 71).

A center-to-center distance adjusting mechanism A3 serving as a tension adjusting mechanism, including the circular hole 71, the movable housing 72, and the eccentric hole 74, is constructed. Further, either one of flanges 75 and 76 against which the fixed housing 39C and the movable housing 72 are abutted is provided with a screw hole 77, and the other flange is provided with a screw insertion hole 78 in a circular arc shape. A fixed screw 79 through which the screw insertion hole 78 in a circular arc shape is inserted is screwed into the screw hole 77, to fasten the flanges 75 and 76 in both the housings 39C and 72 to each other such that the rotational position is adjustable.

According to the present embodiment, a center-to-center distance D between a center axis 28a of an input pulley 28 and a center axis 29a of an output pulley 29 is adjusted only by rotating the movable housing 72, together with the motor housing 20 in the electric motor 15, to move the center axis 28a farther away from the center axis 29a, thereby making it possible to adjust the tension of a belt 30. The movable housing 72 and the motor housing 20 can be also separately constructed.

Sixth Embodiment

Figure 9:
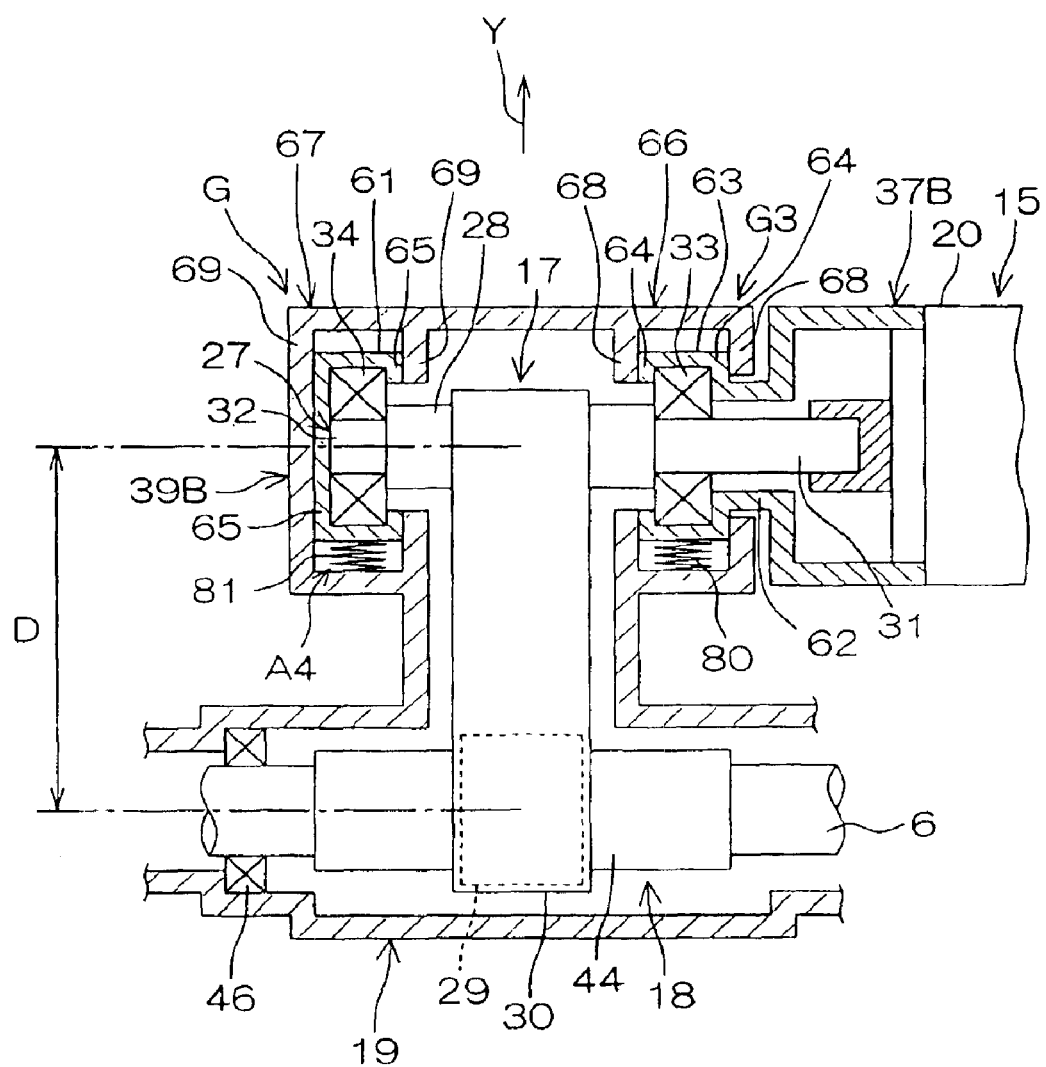
FIG. 9 is a cross-sectional view showing a sixth embodiment of the present invention.

Then, FIG. 9 illustrates a sixth embodiment of the present invention. Referring to FIG. 9, a center-to-center distance adjusting mechanism A4 in the present embodiment differs from the center-to-center distance adjusting mechanism A2 in the embodiment shown in FIG. 6 in that a pair of drive screws 51a and 51b is replaced with the pair of elastic members 80 and 81 composed of a compression coil spring, for example.

In the sixth embodiment, a connection housing 37B and a support housing 61 for respectively supporting first and second ends 31 and 32 of an input shaft 27 are elastically urged along a longitudinal direction Y by the elastic members 80 and 81, thereby making it possible to automatically adjust the tension of a belt 30 to a proper value for a long time.

The present invention is not limited to each of the above-mentioned embodiments. For example, in each of the embodiments, the input and output pulleys 28 and 29 may be formed of synthetic resin such as polyacetal resin to reduce shock (an excitation force) caused by engagement with the belt 30, thereby further reducing noise.

Seventh Embodiment

Figure 10:
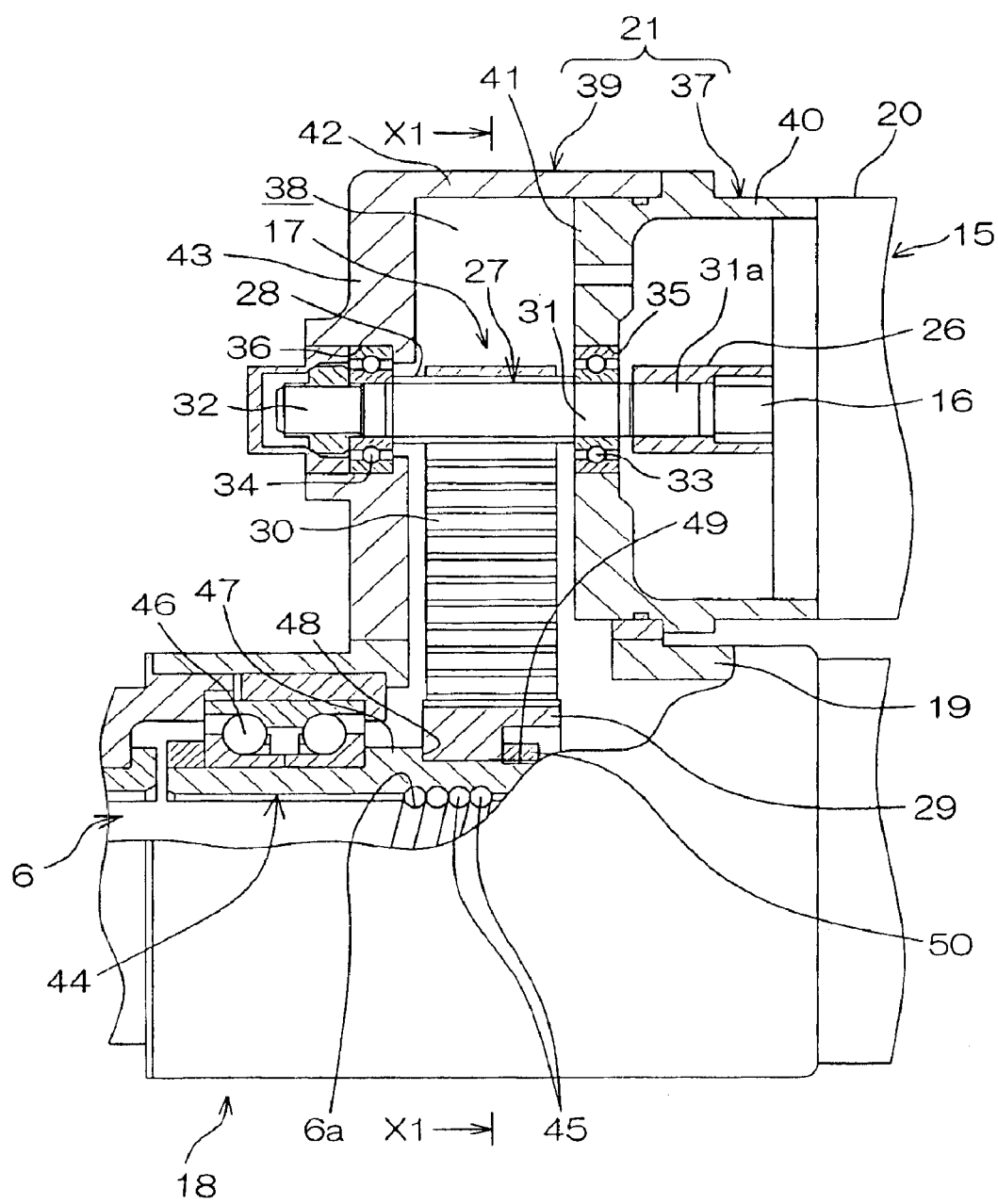
FIG. 10 is a cross-sectional view of a principal part of an electric power steering apparatus according to a seventh embodiment of the present invention.
Figure 11:
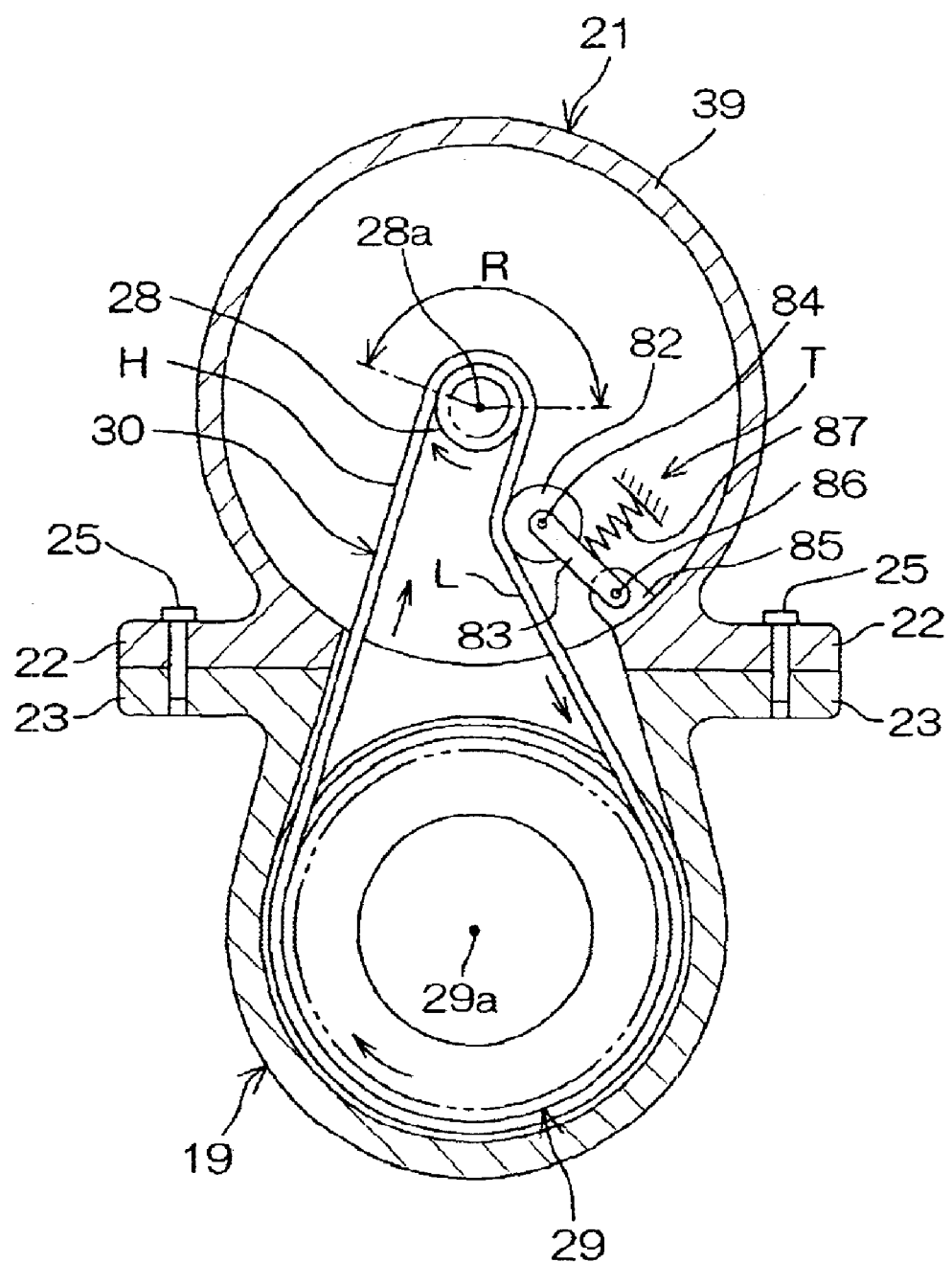
FIG. 11 is a cross-sectional view taken along a line XI—XI shown in FIG. 10.
Figure 12:
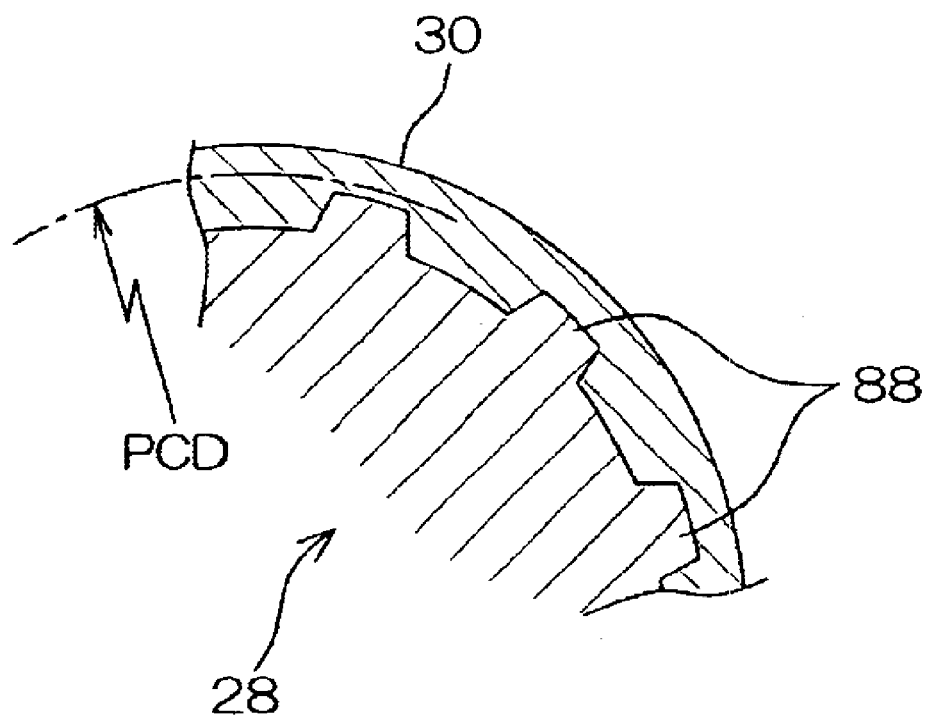
FIG. 12 is an enlarged view of a principal part of an input pulley and a belt in the seventh embodiment.

FIGS. 10, 11, and 12 illustrate a seventh embodiment of the present invention.

Although in FIG. 10, an electric power steering apparatus according to the seventh embodiment is approximately the same in configuration as the electric power steering apparatus shown in FIG. 2, it differs therefrom in that the spacer 24 is abandoned. In FIG. 10, the same components as those in the embodiment shown in FIG. 2 are assigned the same reference numerals and hence, the description thereof is not repeated.

Referring to FIG. 11, a tensioner T for adjusting the tension of a belt 30 is provided. The tensioner T comprises a tensioner pulley 82 for pressing a slack side L of the belt 30 toward a tension side H. The tensioner pulley 82 is supported on one end of a swing arm 83 serving as a movable member so as to be rotatable through a supporting shaft 84. The other end of the swing arm 83 is supported on a supporting bracket 85 serving as a fixed member fixed to a speed reducing mechanism housing 39 through a supporting shaft 86.

The swing arm 83 is rotated and urged in the direction in which tension can be applied to the belt 30 (in a counter-clockwise direction in FIG. 11) by an urging member 87 composed of a torsion coil spring, for example. The urging member 87 can use a torsion spring wrapped around the supporting shaft 86, for example, as schematically illustrated in FIG. 11. A belt wrap contact area R on an input pulley 28 having a small diameter is widened by the function of the tensioner T.

The belt 30 is composed of a toothed belt (cocked belt), for example, as shown in FIG. 12, and the input pulley 28 is constructed as a toothed pulley having teeth 88 engaging with the toothed belt formed at equally spaced divisions in its circumferential direction on the outer periphery of an input shaft 27. A toothed pulley is also similarly used as an output pulley 29 having a large diameter. In FIG. 12, PCD indicates the pitch circle diameter of the input pulley 28 having a small diameter.

According to the seventh embodiment, the belt wrap contact area R on the input pulley 28 having a small diameter expands by pressing the slack side L of the belt 30 toward the tension side H by the tensioner pulley 82. Even when a pulley 28 of a small size is used as the input pulley 28 so as to ensure a high reduction gear ratio, therefore, stable torque transmission can be achieved, and durability can be improved. By achieving the high reduction gear ratio, it is possible to employ an electric motor having a high speed and a low torque and also contribute to cost reduction.

Particularly when a toothed pulley engaging with the belt 30 composed of the cocked belt is used as the input pulley 28 having a small diameter, as in the present embodiment, the number of teeth 88 engaging with the belt 30 can be increased in the input pulley 28 having a small diameter, thereby making it possible to increase the effect of improving durability.

When the pitch circle diameter PCD of the input pulley 28 (see FIG. 12) is within a range of 12 to 30 mm, it is preferable that a center angle corresponding to the belt wrap contact area R on the input pulley 28 is within a range of 135 to 210 degrees. Consequently, it is possible to ensure a sufficient amount of belt wrapping on the input pulley 28 having a small diameter and therefore, to ensure stable torque transmission and durability while achieving a small size and a high reduction gear ratio.

Eighth Embodiment

Figure 13:
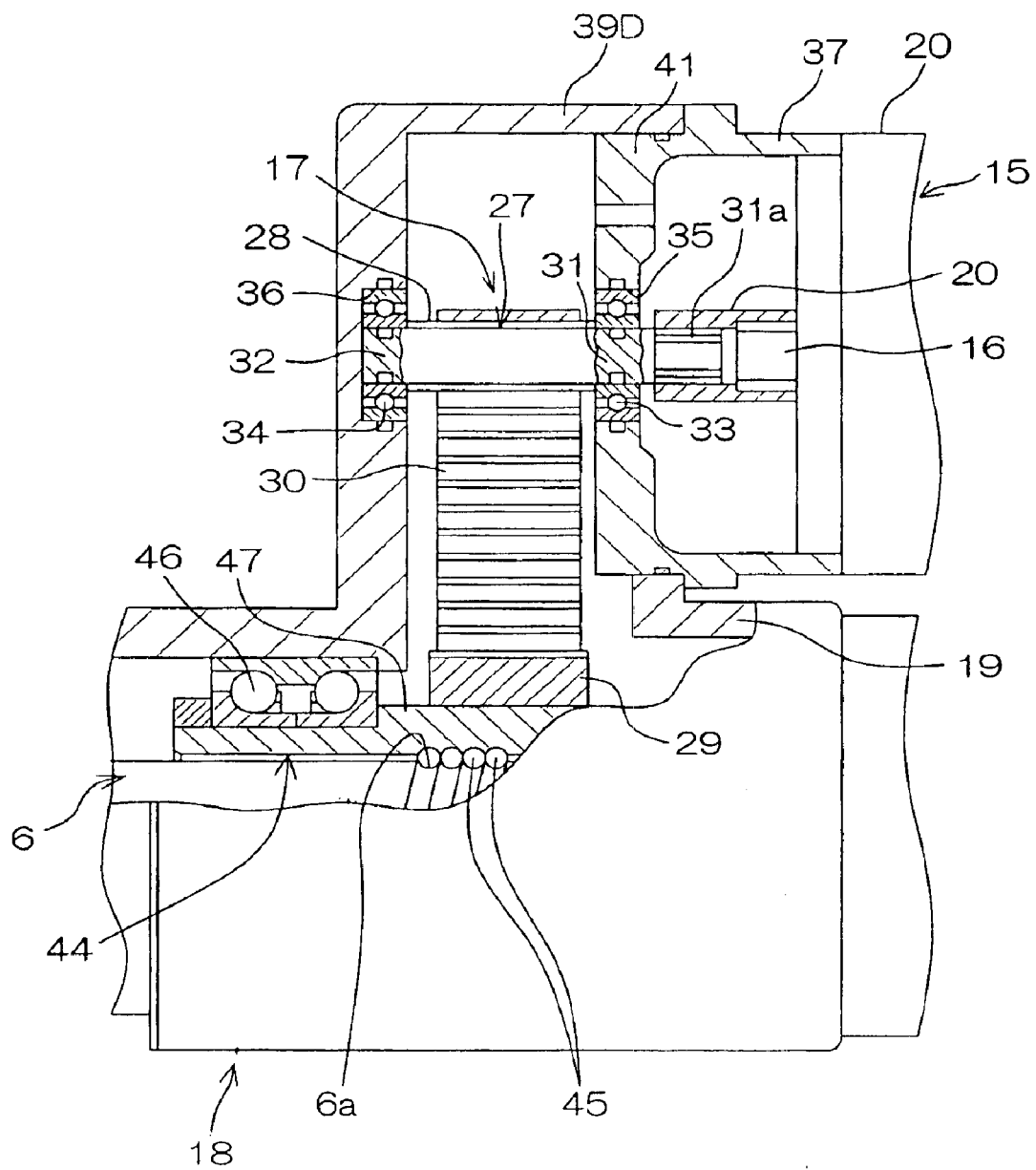
FIG. 13 is a cross-sectional view of a principal part of an electric power steering apparatus according to an eighth embodiment of the present invention.
Figure 14:
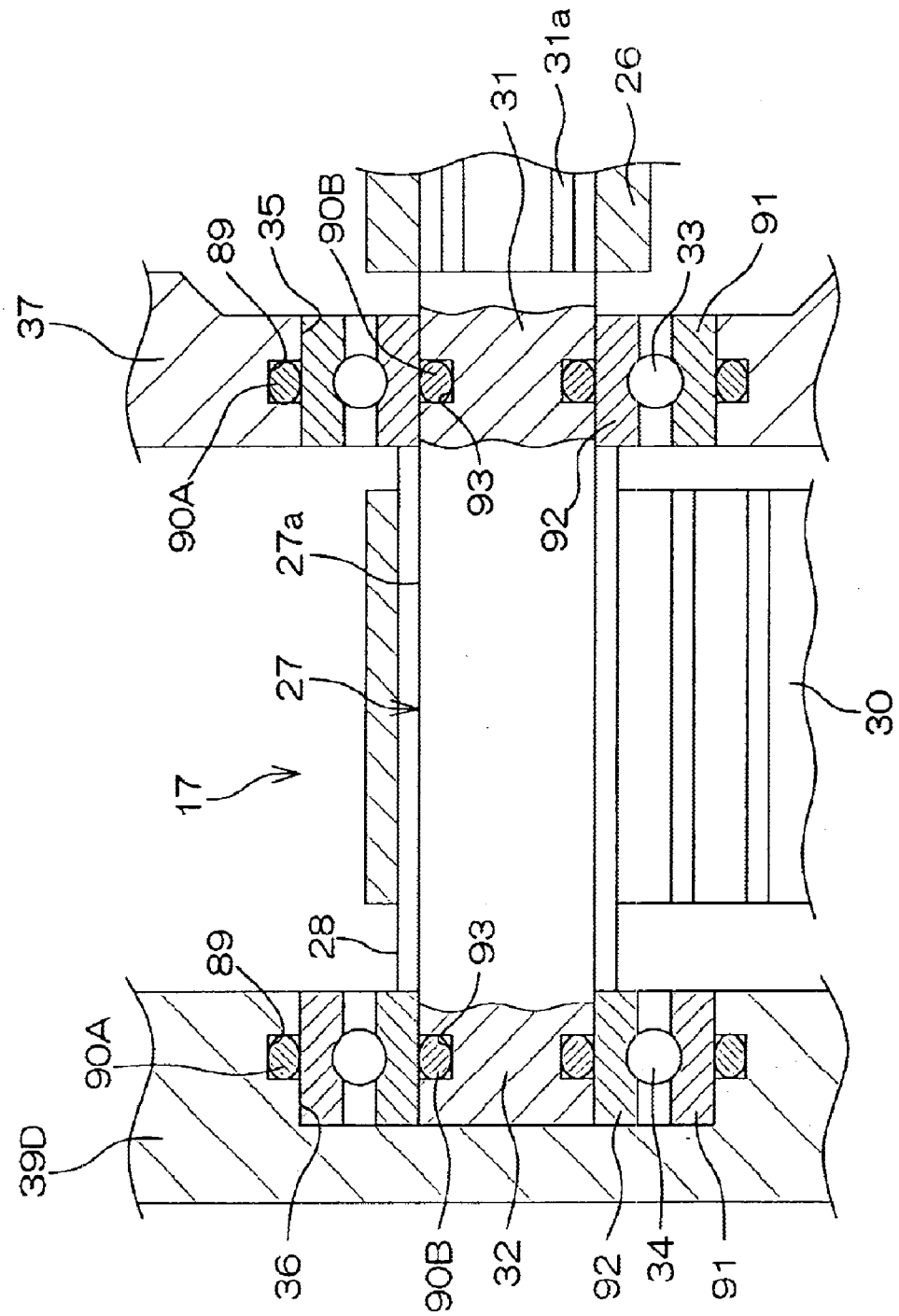
FIG. 14 is an enlarged view of a supporting structure of an input pulley and an input shaft in the eighth embodiment.

FIG. 13 and FIG. 14 which is an enlarged view illustrate an eighth embodiment of the present invention. Referring to FIG. 13, a holding housing 39D serving as a speed reducing mechanism housing is integrally formed in a predetermined portion of a rack housing 19.

First and second ends 31 and 32 of an input shaft 27 are respectively supported so as to be rotatable on corresponding supporting holes 35 and 36 of a connection housing 37 and the holding housing 39D through corresponding bearings 33 and 34.

Referring to FIG. 14, a peripheral groove 89 is formed in each of the supporting holes 35 and 36, and a cushioning material 90A serving as elastic supporting means is accommodated in each of the peripheral grooves 89. The cushioning materials 90A are respectively interposed between the corresponding supporting holes 35 and 36 and outer rings 91 of the corresponding bearings 33 and 34, to elastically support the corresponding outer rings 91. The supporting hole 35 or 36 and the outer ring 91 are loosely fitted to each other.

Furthermore, peripheral grooves 93 are respectively formed in an outer periphery 27a of the input shaft 27 corresponding to inner rings 92 of the bearings 33 and 34, and a cushioning material 90B serving as elastic supporting means is accommodated in each of the peripheral grooves 93. The cushioning materials 90B respectively elastically support the corresponding ends 31 and 32 of the input shaft 27. As a result, the input shaft 27 is elastically supported on the holding housing 39D and the connection housing 37 through the cushioning materials 90A and 90B. The input shaft 27 and the inner ring 92 are loosely fitted to each other.

An elastic member such as synthetic rubber or synthetic resin can be used as the cushioning materials 90A and 90B. If an O-ring is used as an annular elastic member, for example, however, standard components can be also employed, resulting in reduced cost.

According to the eighth embodiment, vibrations respectively transmitted to the holding housing 39D and the connection housing 37 from the input shaft 27 can be significantly restrained by the functions of the cushioning materials 90A and 90B, thereby making it possible to significantly reduce noise within a vehicle chamber.

Although in the eighth embodiment, both the cushioning material 90A directly receiving the outer ring 91 and the cushioning material 90B directly receiving the input shaft 27 are provided, the present invention is not limited to the same. For example, either one of the cushioning material 90A and the cushioning material 90B may be provided.

Furthermore, a cocked belt may not be employed as a belt.

Ninth Embodiment

Figure 15:
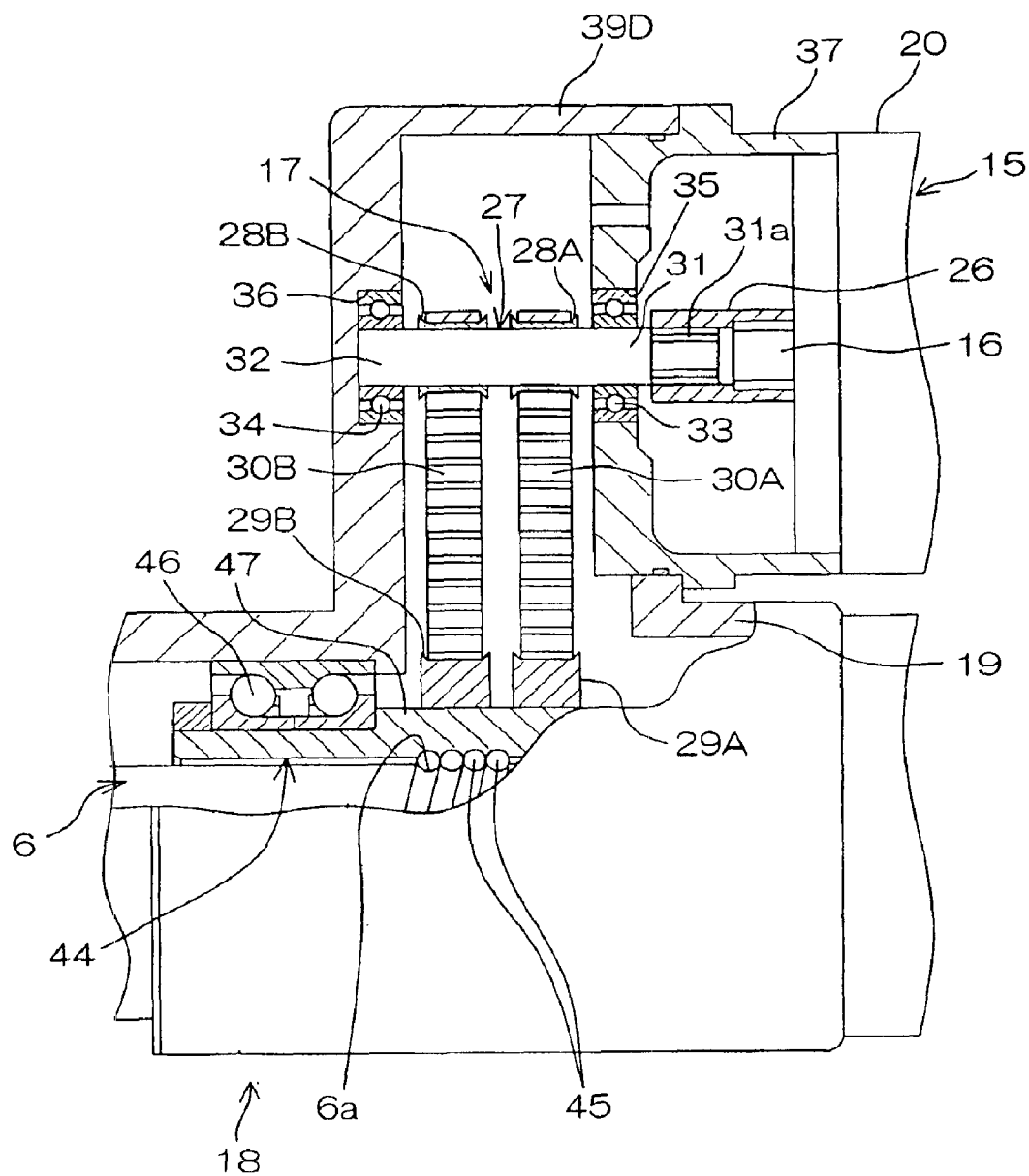
FIG. 15 is a cross-sectional view of a principal part of an electric power steering apparatus according to a ninth embodiment of the present invention.

FIG. 15 is an enlarged view of a principal part of an electric power steering apparatus 1. Referring to FIG. 15, the ninth embodiment is the same as the embodiment shown in FIG. 13 in that a motor housing 20 in an electric motor 15 is fixed to a holding housing 39D in a rack housing 19 through a connection housing 37.

In the ninth embodiment, a speed reducing mechanism 17 comprises an input shaft 27 coaxially connected to a rotatable shaft 16 in the electric motor 15 so as to be integrally rotatable through a coupling joint 26 using a spline 31a, for example, a pair of input pulleys 28A and 28B provided in the input shaft 27 so as to be integrally rotatable, a pair of output pulleys 29A and 29B having a large diameter arranged with a rack shaft 6 serving as a steering shaft enclosed thereby, and a pair of endless belts 30A and 30B respectively wrapped between the input pulleys 28A and 28B and the output pulleys 29A and 29B which respectively correspond to each other.

Figure 16:
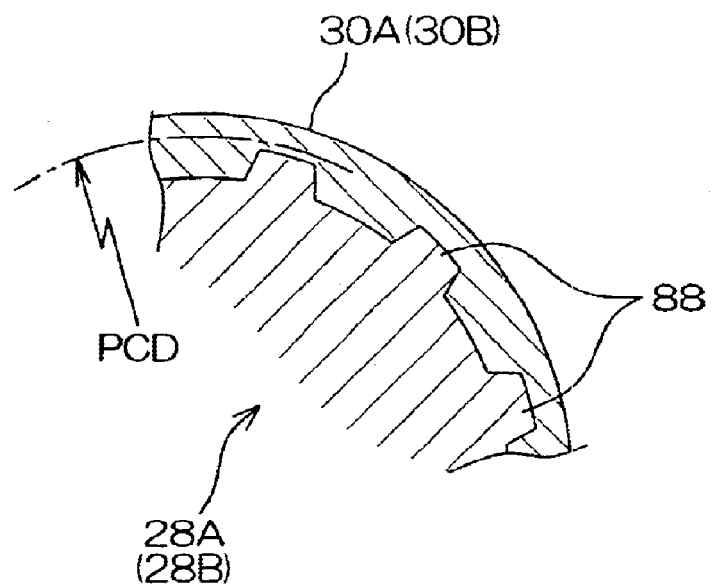
FIG. 16 is an enlarged view of a principal part of an input pulley and a belt in the ninth embodiment.

The belt 30A is composed of a toothed belt (a cocked belt), for example, as shown in FIG. 16, and the corresponding input pulley 28A is constructed as a toothed pulley having teeth 88 engaging with the toothed belt formed at equally spaced divisions in its circumferential direction on its outer periphery. The belt 30B is also composed of a toothed belt, and the corresponding input pulley 28B is also constructed as a toothed pulley. Further, a toothed pulley is also similarly used as the output pulleys 29A and 29B, which is not illustrated. The PCD indicates the pitch circle diameter of each of the input pulleys 28A and 28B.

Figure 17:
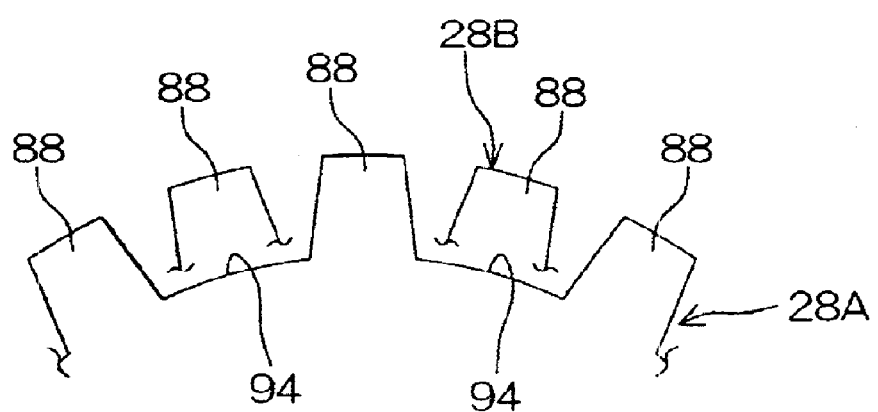
FIG. 17 is a schematic view showing a phase shift between a pair of input pulleys in the ninth embodiment.

Referring to FIG. 17 which is a schematic view, the respective rotational phases of the pair of input pulleys 28A and 28B are shifted from each other so that the teeth 88 of one of the input pulleys 28A and 28B are put at positions corresponding to tooth grooves 94 of the other pulley.

According to the present embodiment, a torque is transmitted using the pair of belts 30A and 30B in parallel in a torque transmission path, thereby making it possible to reduce a torque applied to each of the belts 30A and 30B by half, as compared with that in a conventional case where it is transmitted by a single belt. As a result, belt vibration and noise caused thereby can be significantly reduced. Particularly, fluctuations in the tension of the belt in a case where a steering wheel is cut are reduced, thereby making it possible to reduce a warming sound of the belt.

Moreover, the respective phases of the pair of input pulleys 28A and 28B composed of the toothed pulley are shifted from each other such that the teeth 88 of one of the input pulleys 28A and 28B correspond to the positions of the tooth grooves 94 of the other input pulley.

Accordingly, the crest of vibration of one of the belts 30A (30B) is overlapped with the trough of vibration of the other belt 30B (30A) to cancel both the vibrations. Therefore, fluctuations in the torque can be further reduced, to further reduce vibration and noise as a whole. Further, the fluctuations in the tension in the case where the steering wheel is cut can be canceled, thereby making it possible to significantly reduce the warming sound.

Tenth Embodiment

Figure 18:
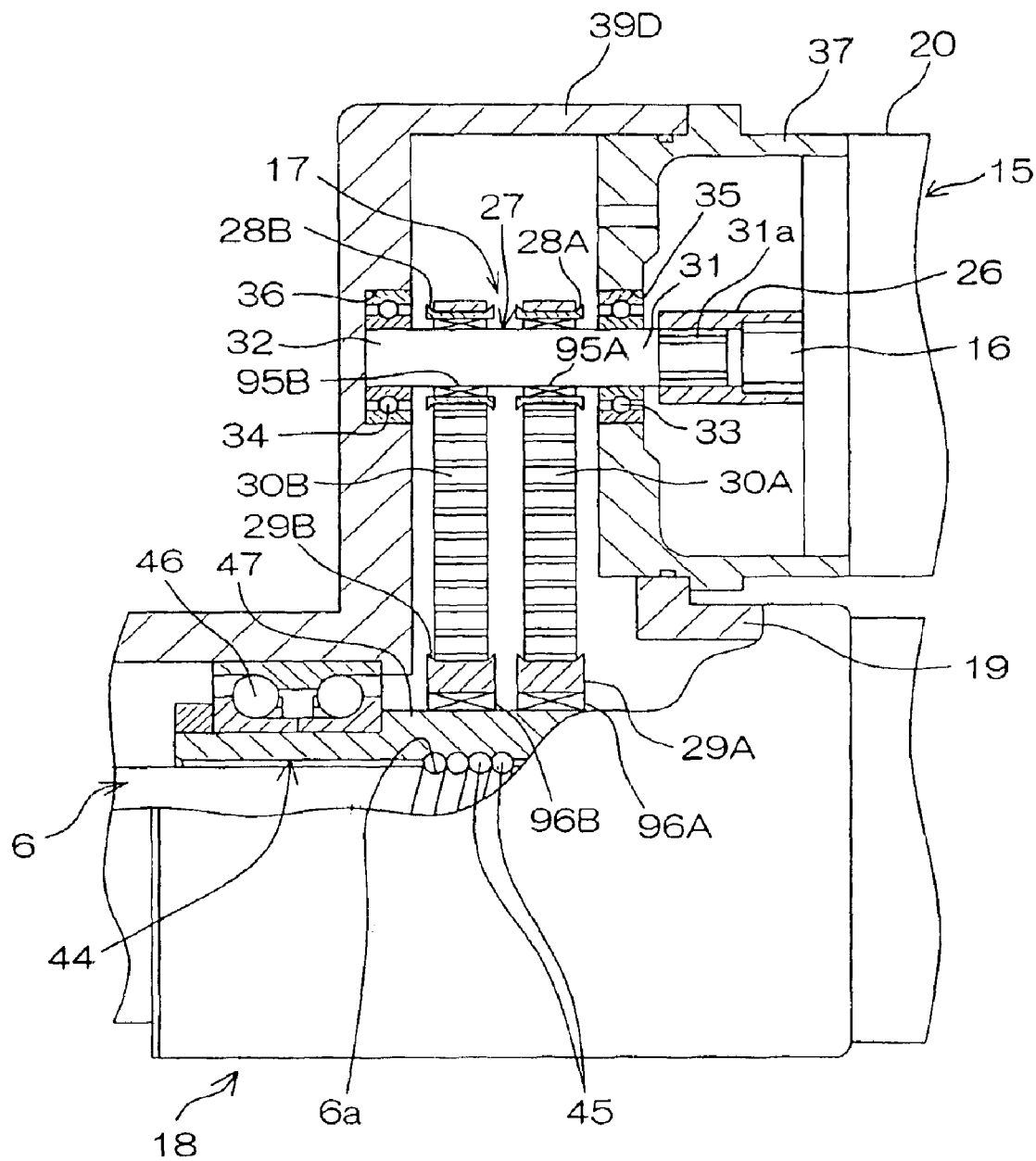
FIG. 18 is a cross-sectional view of a principal part of an electric power steering apparatus according to a tenth embodiment of the present invention.

Then, FIG. 18 illustrates a tenth embodiment of the present invention. Referring to FIG. 18, the present embodiment is characterized in that a pair of first one way clutches 95A and 95B is interposed between an input shaft 27 and input pulleys 28A and 28B, respectively, and a pair of second one way clutches 96A and 96B is interposed between output pulleys 29A and 29B and a ball nut 44 serving as an input section of a converting mechanism 18, respectively. As the one way clutches 95A, 95B, 96A, and 96B, various types of known one way clutches can be used in addition to a sprag type one way clutch, for example.

The first and second one way clutches 95A and 96A corresponding to the one belt 30A and first and second one way clutches 95B and 96B corresponding to the other belt 30B are respectively allowed to rotate in opposite directions.

According to the present embodiment, in cutting a steering wheel 2, when a rotatable shaft 16 in an electric motor 15 starts to rotate in the opposite direction, the one belt 30A which has so far rotated in the direction of rotation of the rotatable shaft 16 starts to idle by the corresponding first and second one way clutches 95A and 96A, and the other belt 30B which has so far idled starts to rotate in the direction of rotation of the rotatable shaft 16 through the corresponding first and second one way clutches 95B and 96B, for example, to transmit a torque. As a result, a warming sound at the time of cutting the steering wheel 2 can be solved. Further, the belt which has so far idled functions immediately when the steering wheel 2 is cut. Accordingly, there is no time lag in belt transmission at the time of cutting the steering wheel 2, thereby making it possible to improve responsibility.

In the tenth embodiment, a cocked belt may not be employed as the belt.

The present invention is not limited to each of the above-mentioned embodiments. For example, a bearing screw mechanism can be used in place of the ball screw mechanism. Further, the rotatable shaft 16 in the electric motor 15 and the input shaft 27 can be integrally formed.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An electric power steering apparatus comprising an electric motor for producing a steering assist force, further comprising:
    a speed reducing mechanism for decelerating a rotation of a rotatable shaft in the electric motor; and
    a converting mechanism for converting an output rotation of the speed reducing mechanism into an axial movement of a steering shaft extending toward right and left sides of a vehicle,
    the speed reducing mechanism comprising
    an input pulley driven by the electric motor,
    an output pulley arranged with the steering shaft enclosed thereby,
    a belt for connecting the input pulley and the output pulley, and
    means for adjusting a tension of the belt; wherein
    the means for adjusting the tension includes means for changing a center-to-center distance between the input pulley and the output pulley; wherein
    the means for changing the center-to-center distance includes a guiding mechanism for relatively guiding the first housing for holding the input pulley and the second housing for holding the steering shaft in a predetermined guiding direction in which the center-to-center distance can be changed; and wherein
    the predetermined guiding direction includes a direction perpendicular to a plane including center lines of the input pulley and the output pulley.

2. The electric power steering apparatus according to claim 1, wherein
    the predetermined guiding direction includes a direction perpendicular to the center lines of the input pulley and the output pulley.

3. The electric power steering apparatus according to claim 1, wherein
    the guiding mechanism includes a guiding mechanism having a screw for connecting the opposite portions of the first housing for holding the input pulley and the second housing for holding the steering shaft and a screw insertion hole composed of a slot provided in one of the opposite portions and extending in the predetermined guiding direction.

4. The electric power steering apparatus according to claim 1, wherein
    the means for changing the center-to-center distance further comprises a screw which can relatively drive the first and second housings in the predetermined guiding direction.

5. The electric power steering apparatus according to claim 1, wherein
    the means for changing the center-to-center distance further comprises an elastic member for relatively urging the first and second housings in the predetermined guiding direction.

6. The electric power steering apparatus according to claim 1, wherein
    the means for adjusting the tension includes a tensioner having a fixed member, a movable member, a tensioner pulley supported on the movable member so as to be rotatable and engaging with the belt, and urging means for urging the tensioner pulley through the movable member in the direction in which tension is applied to the belt.

7. The electric power steering apparatus according to claim 6, wherein
    a slack side of the belt is pressed toward a tension side by the tensioner pulley so that a belt wrap contact area on the input pulley expands.

8. The electric power steering apparatus according to claim 7, wherein
    a pitch circle diameter of the input pulley is within a range of 12 to 30 mm, and
    a center angle of the input pulley, corresponding to the belt wrap contact area on the input pulley, is within a range of 135 to 210 degrees.

9. The electric power steering apparatus according to claim 1, wherein
    the belt comprises a cocked belt, and
    the input pulley and the output pulley respectively comprise a toothed pulley.

* * * * *